INVENTOR.
HANS R. ROTTMANN

April 12, 1966  H. R. ROTTMANN  3,245,533
INSPECTING GLASS CONTAINER FOR HORIZONTAL CHECKS
Filed Dec. 19, 1963  4 Sheets-Sheet 3
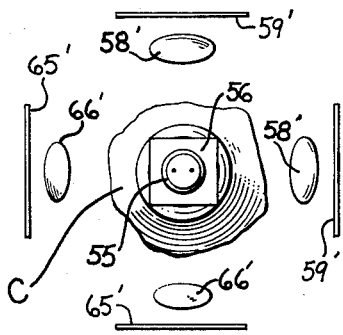
FIG. 7
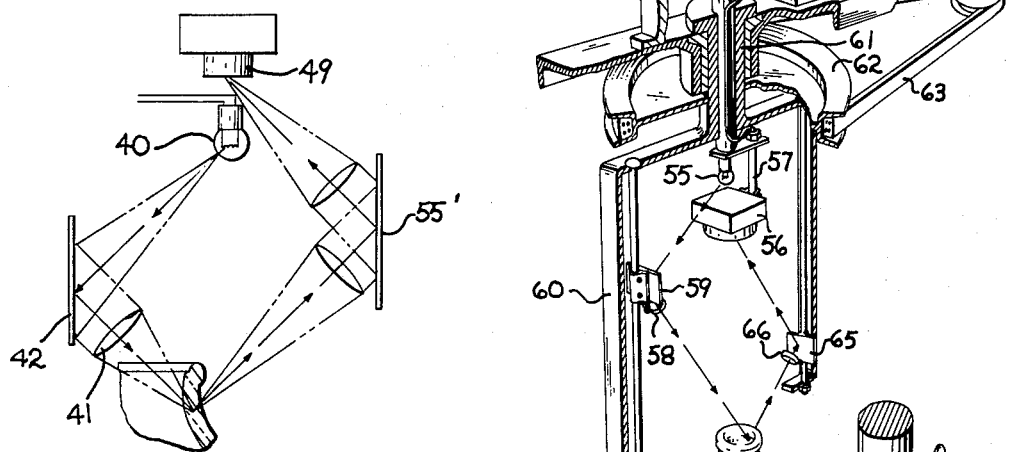
FIG. 5
FIG. 3
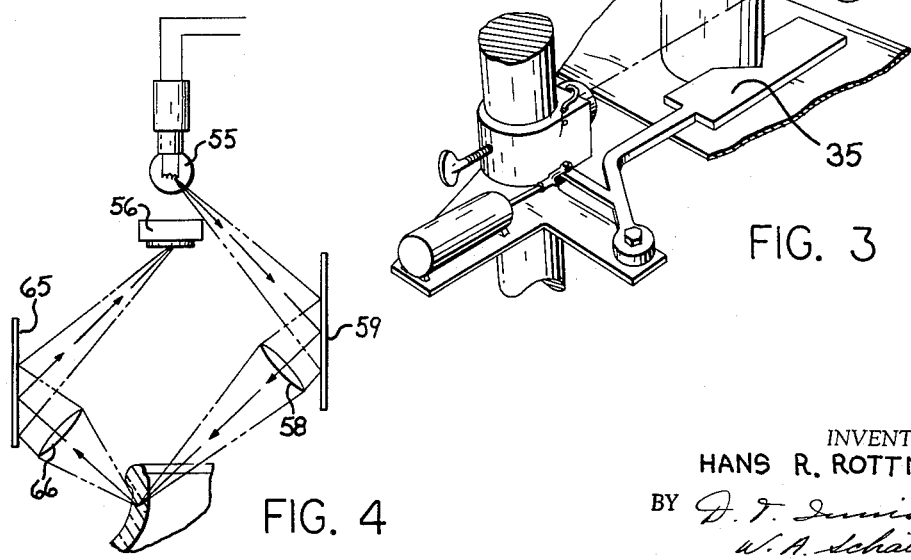
FIG. 4
INVENTOR.
HANS R. ROTTMANN
BY
ATTORNEYS United States Patent Office 3,245,533
Patented Apr. 12, 1966

3,245,533
INSPECTING GLASS CONTAINER FOR
HORIZONTAL CHECKS
Hans R. Rottmann, Toledo, Ohio, assignor to Owens-
Illinois Glass Company, a corporation of Ohio
Filed Dec. 19, 1963, Ser. No. 336,850
10 Claims. (Cl. 209—111.7)

This invention relates to inspecting glass containers for horizontal checks and particularly to inspecting such glass containers when they are still hot from forming operation. A horizontal check is a defect which sometimes occurs in the finish of the glass container and comprises a mirrorlike surface that extends in a substantially horizontal plane.

It is an object of the invention to provide a method and apparatus for inspecting the finish of glass containers for horizontal checks without rotating the glass containers so that the containers can be inspected while they are still hot and with a minimum of handling.

It is a further object of the invention to provide such a method and apparatus wherein the containers are inspected while they are moving substantially continuously at high speeds.

It is a further object of the invention to provide such a method and apparatus that is quick and efficient and wherein there is no contact with the finish of the glass containers.

Basically, the method and apparatus comprises moving the containers successively through an inspection station and directing a plurality of light beams along radial planes downwardly and focusing them into spots in the finish of the container at the inspection station. A horizontal check in the finish will reflect a portion of a light beam upwardly where it is redirected by a mirror to light sensitive means positioned above and in axial alignment with the container at the inspection station. In one embodiment, the plurality of light beams are provided by distinct light sources. In another embodiment, the plurality of light beams are provided by rotating a mirror about the axis of the container to cause a beam from a single source to successively scan the finish of the container. In accordance with the invention, in one embodiment, the inspection is conducted while the container is moving through the inspection station continuously. In another embodiment, the container is momentarily interrupted in its movement by a member that moves into position. Where the container is hot from the forming operation, this member is heated to prevent stresses from being formed in the hot container. Further in accordance with the invention, a second light beam is directed across the path of a container at the inspection station and is interrupted by the presence of a container to condition the reject means so that the container will only be rejected if the container is in proper inspection position and the light sensitive means is energized to produce a reject signal substantially simultaneously therewith.

In the drawings:

FIG. 3 is a fragmentary part sectional perspective view of a further modified form of apparatus.

FIG. 4 is a partly diagrammatic view of one form of apparatus.

FIG. 5 is a partly diagrammatic view of another form of apparatus.

FIG. 7 is a diagrammatic plan view of a modified form of apparatus.

Figure 1:
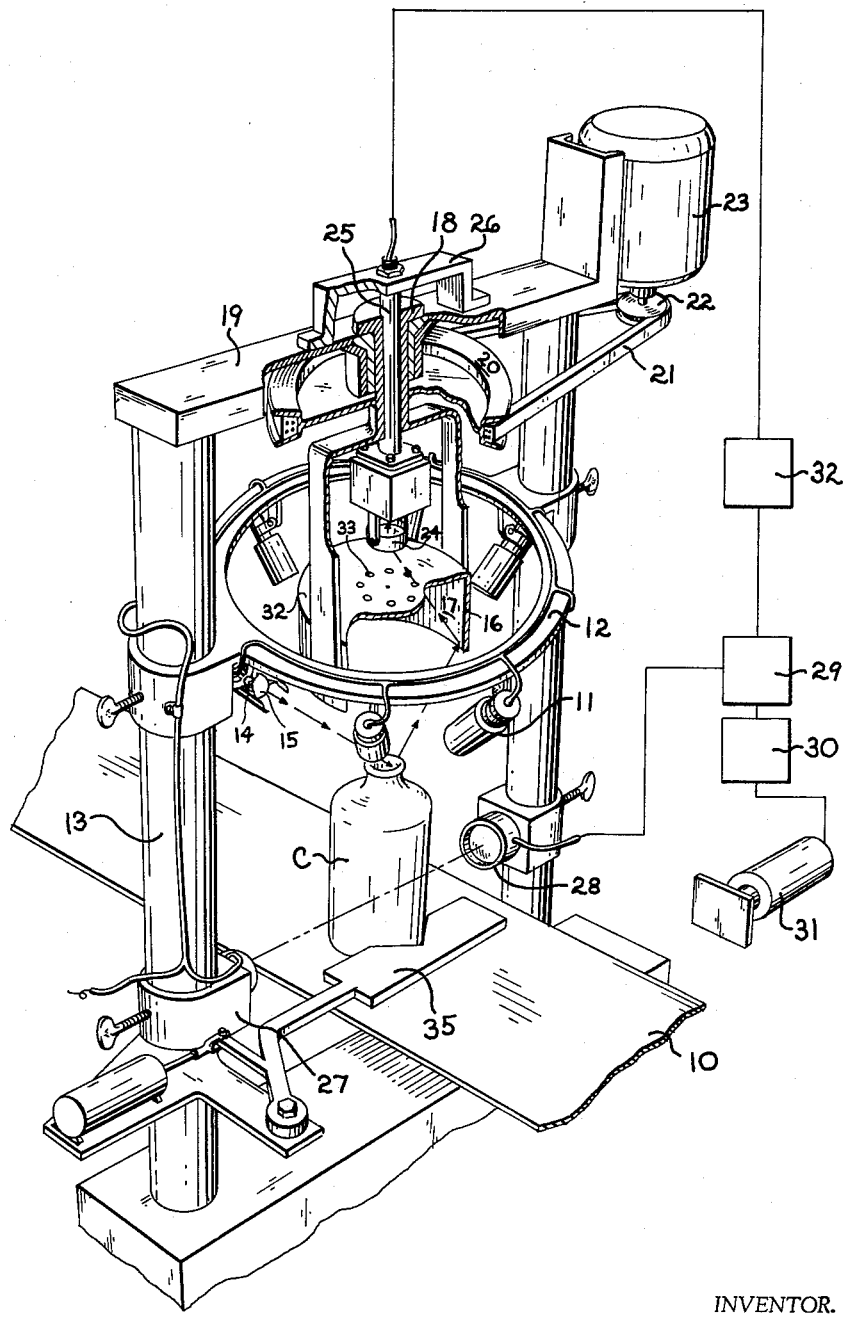
FIG. 1 is a fragmentary part sectional perspective view of an apparatus embodying the invention.

Referring to FIG. 1, the apparatus comprises a conveyor 10 which successively moves open-mouth glass containers C thereon through an inspection station. At the inspection station, a plurality of light units 11, shown as eight in number, are provided on a ring 12 mounted on a support 13 in horizontal overlying relation to the container at the inspection station. Each light unit 11 includes a light source 14 and one or more lenses 15 which direct and focus a light beam downwardly along a radial plane and at an acute angle to a horizontal plane in a spot in the finish of the container. The spots from light units 11 overlap one another slightly to illuminate the entire finish of the container. If a container C is present at the inspection station and a horizontal check is present in the finish of the container, the horizontal check will cause a portion of the spot of light to be reflected upwardly and outwardly. A cylindrical mirror 16 having an inner mirror surface 17 is supported for rotation on a spindle 18 journalled in frame member 19 of support 13. An integral pulley 20 on spindle 18 is driven by an endless belt 21 trained over the pulley 22 of a motor 23 so that the mirror 16 can be continuously rotated about the axis of the container at the inspection station. A light sensitive cell 24 is mounted on the lower end of a shaft 25 which extends through the spindle 18 and is fixed to a support 26 on the frame member 19. The light sensitive cell 24 is axially aligned with the container when the container is present at the inspection station.

In order to determine the presence of a container at the inspection station, a source of light 27 directs a fine pencil-like light beam transversely across the path of the containers to a second light sensitive cell 28 that has a limited angle of vision. When an article reaches the inspection station and interrupts the beam from the light source 27, light cell 28 is de-energized, producing a conditioning signal that passes to a conditioning mechanism 29 to condition the reject mechanism 30 that controls the operation of the reject cylinder 31 positioned at a point beyond the inspection station. This conditioning signal conditions the reject mechanism 30 so that if the second light cell 24 is energized, the signal therefrom, after being amplified by amplifier 32, passes to the reject mechanism 30 to energize the reject cylinder 31. If no signal from light cell 28 is received, the reject mechanism will not be energized even though a signal from cell 24 is received.

Figure 6:
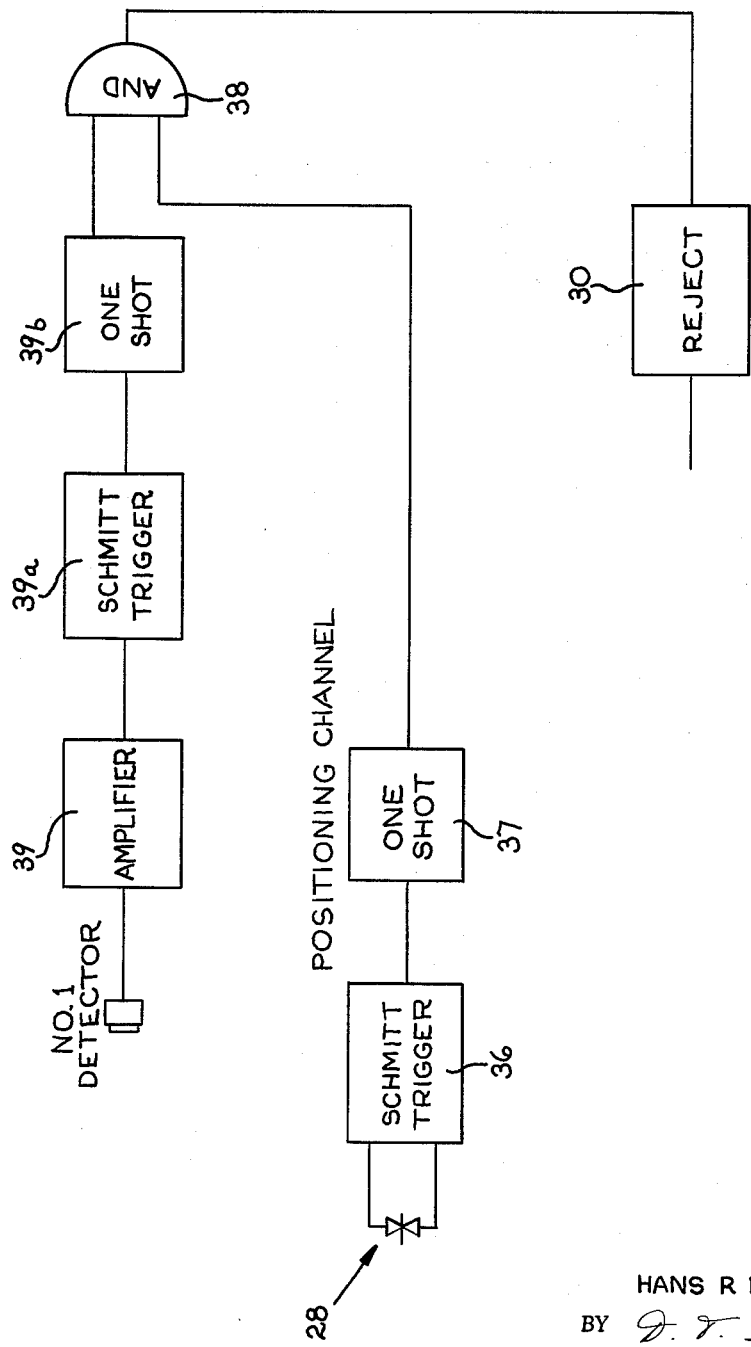
FIG. 6 is a block diagram of the electronic system used with the apparatus.

FIG. 6 is a block diagram of the electronic system used in the apparatus and comprising the conditioning mechanism 29. As shown in FIG. 3, when a container C moves into position to interrupt the light beam from the light source 27, a positive step signal occurs at the output of the light sensitive cell 28 which is normalized by Schmitt trigger 36 and is converted into a short pulse by the one-shot 37. This signal indicates that the container is in proper position and conditions the AND gate 38. If a reject signal is produced at the inspection station by reflection of the light to cell 24, the signal is amplified by an amplifier 39 and passes to a Schmitt trigger 39a that energizes a one-shot 39b to produce a voltage signal at the AND gate 38 which coincides with the signal arriving from the one-shot 37. A resultant signal is produced at the output of the AND gate 38 and activates the reject mechanism 30.

In operation, as a container C reaches the inspection station, the passage of light from light source 27 to light detector 28 is interrupted, indicating the presence of a container. The light beams from light units 11 are continuously directed downwardly so that when the container is present at the inspection station, any horizontal check which is in a substantially horizontal plane or deviates slightly therefrom will reflect a portion of the light upwardly. The reflected portion of the light will strike the annular mirror surface 17 and be reflected therefrom upwardly to the light cell 24.

In order to obtain a better signal-to-noise ratio, a top wall 32 is provided in horizontal relation to the mirror 16 and integral therewith. Wall 32 has a plurality of circumferentially spaced openings 33 through which the reflected portion of the beam must pass to the cell 24. Thus, by a rotation of only 45 degrees of the mirror 17, the entire finish of the container is inspected quickly and efficiently so that the container can then continue in its movement along the conveyor.

As described presently in connection with other forms of the invention, in the event that the container is moving rapidly, a more accurate inspection may be achieved by momentarily interrupting the movement of a container by moving a bar 35 (FIG. 2) into the path of the container at the inspection station. If the containers are hot from the forming operation, bar 35 is electrically heated so that there is a minimum temperature differential between the container and the bar and as a result, no stresses will be created in the container. The control of the movement of the bar 35 into and out of position can be achieved under the control of cell 28 or by operating the bar 35 in timed relation with the delivery of the containers C on the conveyor 10.

Figure 2:
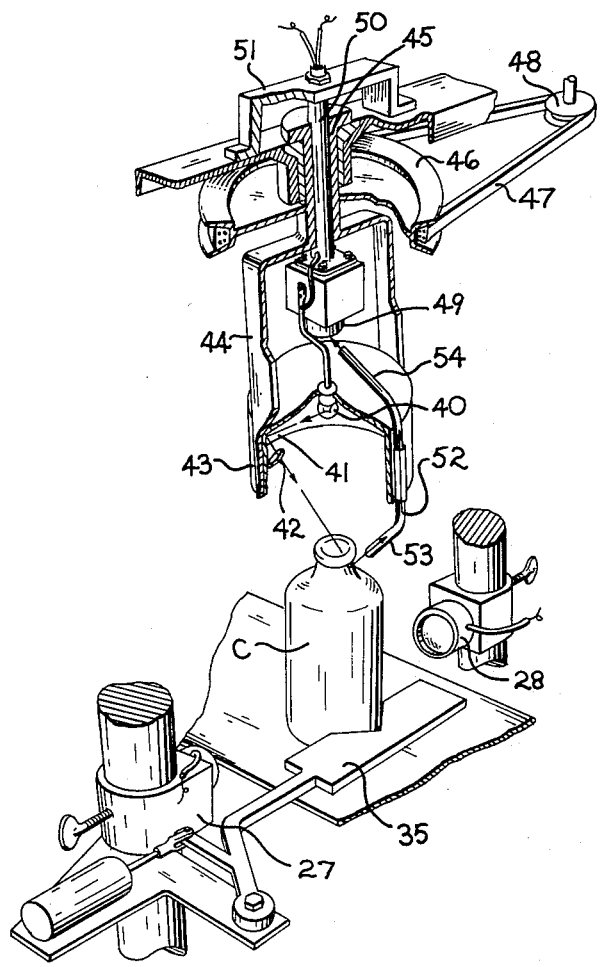
FIG. 2 is a fragmentary part sectional perspective view of a modified form of apparatus.

In the modified form of the invention shown in FIG. 2, a stationary source 40 of light is provided at the inspection station in substantially axial alignment with the container C. This light source 40 directs a beam of light against the mirrored surface 41 of an inverted closed end cylinder 43 and the light reflected from surface 41 is focused by lens 42 in a spot in the finish of the container. Lens 42 directs the beam downwardly along a radial plane and at an acute angle to the horizontal. The cylinder 43 is mounted on a bracket 44 having an integral spindle 45 that is driven by an integral pulley 46, an endless belt 47 and pulley 48 of the motor (not shown). As the cylinder 43 is continuously rotated, the beam is revolved so that in effect a plurality of beams are directed successively at the finish to scan the finish. A light sensitive cell 49 is mounted above the light source 40, in axial alignment with the container at the inspection station, on a shaft 50 which extends through spindle 45 and is mounted on a bracket 51. The light reflected from a horizontal check is picked up by a light pipe 52 such as a quartz bar or rod bent so that its lower end 53 extends downwardly in a radial plane to pick up reflections of the beam by a defect and its upper end 54 extends inwardly to direct the reflected portion to the light cell 49.

In operation, as a container C is moved into position at the inspection station, the light beam from source 27 is interrupted, de-energizing cell 28 and conditioning the reject mechanism. When the container is present at the inspection station, the beam of light is successively directed against portions of the finish by rotation of the mirror surface 41 so that in one revolution, the finish is scanned. If a horizontal check is present, a portion of the light is reflected and directed by the light pipe 52 against the cell 49 to cause a reject signal which passes through the conditioned reject mechanism to reject the container at a point beyond the inspection station. In the form of the invention shown in FIG. 2, the energization of the cell 28 after passage of the container causes a hot bar 35 to move into position momentarily to interrupt the next container C and hold it at the inspection station during the inspection. Blocking of the beam to 28 can be used, through a time delay mechanism having an interval equal to the time required for inspection to pull the hot bar out of the way to permit the container to continue on the conveyor.

The relative arrangement of the light source and light sensitive means of FIG. 2 is shown diagrammatically in in FIG. 5 wherein the mirror 55' and two adjacent lenses represent the action of the light pipe 52.

In the form of the invention shown in FIG. 3 and diagrammatically in FIG. 4, a light source 55 is positioned above a light cell 56 in axial alignment with the container at the inspection station. Both the light source 55 and cell 56 are mounted on a bracket 57. A beam of light from source 55 is reflected from a mirror 59 and then passes through a lens 58 mounted on a U-shaped support 60 that has an integral spindle 61 driven by an integral pulley 62 and belt 63 trained over a pulley 64 of the motor (not shown). A mirror 65 and lens 66 are also mounted on support 60 in position to pick up and redirect the reflected portion of a beam from a defect.

As in the previous form of the invention, as support 60 is rotated, the mirrors 59 and 65 are also rotated so that a beam of light is directed downwardly along a radial plane at an acute angle to a horizontal plane and focused in a spot in the finish of the container. If a defect is present in the finish, it reflects a portion of the beam upwardly against a mirror 65 which, in turn, reflects the portion of the beam to the cell 56, producing a reject signal in the same manner as the previous form of the invention and rejecting the container if a conditioning signal has been provided by the cell 28.

As shown in FIG. 7, which is a plan diagrammatic view, pairs of mirrors 59' and 65' may be provided in angularly spaced relation so that two beams are simultaneously directed against the finish of the container. By this arrangement, the finish of the container can be scanned in less than one rotation of the support for the mirrors 59' and 65'.

It can thus be seen that there has been provided a method and apparatus for inspecting containers for horizontal checks wherein the containers are not rotated but merely moved along a conveyor and wherein there is no contact between the containers and the gauging mechanism. Where the containers are moved through the inspection station at an exceedingly high speed, a heated bar may be moved into position to momentarily interrupt the movement of the containers without causing damage to the hot containers.

I claim:

1. An apparatus for inspecting glass containers for horizontal checks in the finish which comprises
    means for conveying containers in succession through an inspection station,
    means for directing a plurality of light beams continuously downwardly and inwardly relative to a container along radial planes against the finish of the container,
    an annular interior surface mirror,
    means for supporting said annular mirror above the finish of the container in axially aligned relation thereto at said inspection station,
    light sensitive means,
    means for supporting said light sensitive means above the container in substantial axial alignment with the axis of the container in position to be energized by a portion of one of said light beams reflected by a horizontal check upwardly and outwardly against the interior surface of said annular mirror and redirected by said mirror to said light sensitive means,
    and means response to the energization of said light sensitive means for rejecting the container.

2. The combination set forth in claim 1 including means for directing a pencil of light transversely across the path of the containers at the inspection station in such a manner that as each container reaches the inspection station it interrupts said light beam,
    second light sensitive means in the path of said light beam and adapted to be de-energized when the container interrupts the passage of light thereto, and conditioning means for conditioning said reject means so that it is actuated only when a signal is obtained from said second light sensitive means and said first light sensitive means substantially simultaneously.

3. An apparatus for inspecting glass containers for horizontal checks in the finish which comprises
means for conveying containers in succession through an inspection station,
an annular interior surface mirror,
means for supporting said annular mirror above the finish of the container in axially aligned relation thereto at said inspection station,
means for rotating said mirror about its axis,
means for directing a beam of light against said interior surface of said mirror from which the light beam is reflected downwardly and inwardly relative to a container along a radial plane against the finish of the container,
light sensitive means,
means for supporting said light sensitive means above the container in substantial axial alignment with the axis of the container,
means for directing a portion of said light beam reflected by a horizontal check upwardly to said light sensitive means,
and means responsive to the energization of said light sensitive means for rejecting the container.

4. The combination set forth in claim 3 including means for directing a pencil of light transversely across the path of the containers at the inspection station in such a manner that as each container reaches the inspection station it interrupts said light beam,
second light sensitive means in the path of said light beam and adapted to be de-energized when the container interrupts the passage of light thereto,
and conditioning means for conditioning said reject means so that it is actuated only when a signal is obtained from said second light sensitive means and said first light sensitive means substantially simultaneously.

5. The combination set forth in claim 4 wherein said means for directing a portion of said beam reflected by a defect to said light sensitive means comprises a light pipe mounted for rotation with said mirror and having one end thereof adjacent the finish of a container at said inspection station and the other end thereof adjacent said light sensitive means.

6. An apparatus for inspecting glass containers for horizontal checks in the finish thereof which comprises
means for conveying said containers in upright position through an inspection station,
means for directing a beam of light along a radial plane at an acute angle to a horizontal plane against the finish of the container,
said means including a source of light positioned above the container at the inspection station in general axial alignment therewith,
and a mirror positioned radially outwardly from said light beam for directing said beam downwardly,
light sensitive means positioned above said container in substantially axial alignment therewith at said inspection station,
a second mirror,
means for mounting said second mirror in position to redirect a portion of the beam reflected by a defect to said light sensitive means,
and means for rotating both said mirrors in synchronism about the axis of the container at the inspection station.

7. The combination set forth in claim 6 including means for directing a second light beam across the path of the container at said inspection station,
second light sensitive means in the path of said second light beam,
and conditioning means responsive to the energization of said second light sensitive means for conditioning said reject means such that said reject means will reject a container only when said second light sensitive means and said first light sensitive means are actuated substantially simultaneously by the presence of a container inspection station and a defect in the container, respectively.

8. The combination set forth in claim 7 including a heated member movable periodically into the path of the containers at the inspection station in response to energization of said second light sensitive means to momentarily interrupt the container in its movement through the inspection station.

9. An apparatus for inspecting glass containers for horizontal checks in the finish thereof which comprises
means for conveying said containers in upright position without rotation through an inspection station,
a source of light positioned above the container at the inspection station in general axial alignment therewith,
a plurality of mirrors positioned radially outwardly from the light source for directing said light from said light source downwardly and inwardly as a plurality of beams against the finish of the container such that a portion of a light beam is reflected by a horizontal check upwardly and outwardly,
light sensitive means positioned above said container in substantially axial alignment therewith at said inspection station,
a plurality of second mirrors,
means for mounting said second mirrors in position to redirect a portion of a beam reflected by a check to said light sensitive means,
means for focusing said reflected beam on said light sensitive means,
means for rotating said mirrors in synchronism about the axis of the container at the inspection station,
and means responsive to the energization of said light sensitive means to reject said containers at a point beyond said inspection station.

10. An apparatus for inspecting glass containers for horizontal checks in the finish which comprises
means for conveying containers in succession through an inspection station,
means for directing a plurality of light beams continuously downwardly and inwardly relative to a container along radial planes against the finish of the container,
an annular interior surface mirror,
means for supporting said annular mirror above the finish of the container in axially aligned relation thereto at said inspection station,
light sensitive means,
means for supporting said light sensitive means above the container in substantial axial alignment with the axis of the container in position to be energized by a portion of one of said light beams reflected by a horizontal check upwardly and outwardly against the interior surface of said annular mirror and redirected by said mirror to said light sensitive means,
and means responsive to the energization of said light sensitive means for rejecting the container,
a mask having a plurality of circumferentially spaced openings therein,
means for mounting said mask in generally overlying relation to said container at the inspection station in such a manner that the light reflected from the annular mirror passes through one of said openings to said light sensitive means,
and means for rotating said mask about the axis of the container at said inspection station.

(References on following page)

References Cited by the Examiner

UNITED STATES PATENTS

| | | | |
|---|---|---|---|
| 2,410,104 | 10/1946 | Rainey. | |
| 2,593,127 | 4/1952 | Fedorchak | 209—111.7 X |
| 2,902,151 | 9/1959 | Miles | 209—111.7 |
| 3,067,872 | 12/1962 | Fouse | 209—111.7 X |
| 3,089,594 | 5/1963 | Early | 209—111.7 |
| 3,171,033 | 2/1965 | Mathias. | |

OTHER REFERENCES

Electronic Industries, July 1958, p. 56–60, A. I. Tersoff.

M. HENSON WOOD, JR., *Primary Examiner.*

ROBERT B. REEVES, *Examiner.*

R. A. SCHACHER, *Assistant Examiner.*